United States Patent
Ross et al.

(10) Patent No.: US 7,933,622 B2
(45) Date of Patent: Apr. 26, 2011

(54) APPARATUS AND METHOD FOR SELECTIVELY INITIATING A DATA CALL FOR A GROUP COMMUNICATION IN WIRELESS COMMUNICATION NETWORKS

(75) Inventors: David Jonathan Ross, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 985 days.

(21) Appl. No.: 11/360,105

(22) Filed: Feb. 22, 2006

(65) Prior Publication Data

US 2007/0197249 A1  Aug. 23, 2007

(51) Int. Cl.
H04B 7/00 (2006.01)
(52) U.S. Cl. ......... 455/518; 455/517; 455/519; 455/520
(58) Field of Classification Search ........... 455/517–521
See application file for complete search history.

(56) References Cited

U.S. PATENT DOCUMENTS

| | | | |
|---|---|---|---|
| 6,275,712 B1 * | 8/2001 | Gray et al. ................. | 455/522 |
| 6,636,745 B2 * | 10/2003 | Oprescu-Surcobe et al. | 455/458 |
| 6,819,940 B1 | 11/2004 | Kosaki | |
| 7,158,806 B2 * | 1/2007 | Harris et al. .............. | 455/519 |
| 7,289,472 B2 * | 10/2007 | Yano et al. ................. | 370/331 |
| 7,289,816 B2 * | 10/2007 | Mills ......................... | 455/458 |
| 2002/0123362 A1 * | 9/2002 | Kamel et al. ............... | 455/522 |
| 2004/0121791 A1 * | 6/2004 | May et al. .................. | 455/519 |
| 2004/0142713 A1 * | 7/2004 | Harris et al. .............. | 455/509 |
| 2005/0265350 A1 | 12/2005 | Narasimha et al. | |
| 2006/0014556 A1 * | 1/2006 | Park et al. ................. | 455/518 |
| 2006/0111134 A1 * | 5/2006 | Mills ......................... | 455/518 |

FOREIGN PATENT DOCUMENTS

WO  04056139  7/2004

OTHER PUBLICATIONS

International Search Report—PCT/US07/062596, International Search Authority—European Patent Office—Nov. 21, 2007.
Written Opinion—PCT/US2007/062596, International Search Authority, European Patent Office, Nov. 21, 2007.

* cited by examiner

*Primary Examiner* — Edward Urban
*Assistant Examiner* — Fayyaz Alam
(74) *Attorney, Agent, or Firm* — Raphael Freiwirth

(57) ABSTRACT

Apparatus and method for selectively enabling an early push-to-talk (PTT) call set up request in a wireless communications network. When a user activates a directory application on a wireless device, the wireless device checks for network information received from a base station. If the network information indicates that the network is of a predetermined type and can advantageously set up the PTT call, the wireless device enables the early PTT call set up request by sending a data channel set up request to the base station. If the network information does not indicate the network is of the predetermined type, the wireless device does not send any data channel request to the base station until the user has actually initiates a PTT call.

33 Claims, 4 Drawing Sheets

APPARATUS AND METHOD FOR SELECTIVELY INITIATING A DATA CALL FOR A GROUP COMMUNICATION IN WIRELESS COMMUNICATION NETWORKS

BACKGROUND OF THE INVENTION

1. Field of the Invention

The invention generally wireless telecommunications systems, and, more particularly, to flexible push-to-talk call set up in a wireless telecommunication system.

2. Description of the Related Art

In wireless telecommunication systems, push-to-talk (PTT) capabilities are becoming popular with service sectors. PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints (end user devices) occurs within virtual groups, wherein the voice of one "talker" is broadcast to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. In the absence of a wireless multicast channel, each group is formed by the combination of separate point-to-point connections between each endpoint and PTT servers manage the call. Each endpoint is also known as a client. Although, a PTT call is sent to all members of a group, most common use of the PTT call is between one user and another user. One-to-one PTT call represents 90% of all PTT calls.

FIG. 1 illustrates a prior art architecture 100 supporting PTT communications. The architecture includes the deployment of a single PTT server region in conjunction with a carrier's CDMA infrastructure and packet data network. Each region of the PTT servers is deployed over a specific portion of a carrier packet data network. The PTT server within the region may be routing traffic between one or more Packet Data Service Nodes (PDSNs) in the carrier network. A communication device 102 that supports the PTT feature is in communication with a base station (BS) 104. Each BS 104 may be in communication with one or more base transmission stations (BTS) 114. The base station 104 is in communication with a high speed network 106 and PTT communications received from the communication device 102 is sent through the base station 104 and the network 106 to a packet data service node (PDSN). The PDSN communicates with the high speed network 106 and a PTT server's network 108, which is connected to a PTT network 110. The PDSN forwards the PTT communications to a PTT server 112 in the PTT network 110.

The PTT server 112 handles PTT communications among members of a PTT group. The PTT server 112 receives a PTT communication from one member and forwards it to all members of the PTT group. The PTT communication is usually received as data packets from the network 110, and the PTT communication sent out by the PTT server 112 are also in data packet format. A packet data service node (PDSN) and a connected base station (BS) then established through a BTS 114 a dedicated channel to transmit the PTT communication to a receiving mobile client (a PTT member).

FIG. 2 illustrates a prior art message flow 200 for a PTT call set up. When a PTT user (originator) is ready to make a PTT communication, he presses a PTT activation button on his mobile device 102 and a PTT request is thus made. In response to the PTT request received by the mobile device 102, and the mobile device sends a call request to the PTT server 112, which is also known as the PTT dispatcher. The PTT server 112 receives the call request and process the call request. The call request processing includes identifying the PTT user, identifying a PTT group to which the PTT user belongs, identifying member of this PTT group, and preparing announce call messages to be sent to each member of the PTT group.

After the PTT server 112 sends the announce call messages, each announce call message is received by a PDSN and forwarded by the PDSN to a BS 104. The BS 104 broadcasts the announce call message to all the sectors covered by the BTS 114 connected to the BS 104. If a mobile client who is a targeted receiver is available, the mobile client sends an accept call message back to the PTT server 112. After receiving the accept call message from at least one mobile client, the PTT server 112 sends a floor grant message back to the originating mobile client. There may be more than one targeted user in the originator's PTT communication group, and the PTT server 112 will grant the floor to the originator if there is at least one targeted mobile client available. After receiving the floor grant message, the PTT requesting mobile client (originator) can then make a PTT communication.

The PTT communication set up process described above is time sensitive and the initial PTT latency shown in FIG. 2 is affected by network traffic. The long latency affects directly users of the PTT communication. Some attempts have been made to improve the set up process, and one way to speed up the PTT call set up process is to start the PTT call set up process earlier by anticipating the user's intent.

However, starting the PTT call set up earlier may not necessary save a lot time considering new technologies employed in the wireless communications network have already significantly reduced the call set up time. The early PTT call set up would be beneficial only if it takes a relatively long time for a wireless communications network to set up the PTT call. If fact, the early PTT call set up may tight up network resources while waiting for the user's actual PTT request. Therefore, it is desirous to have a system and method for flexibly enabling early PTT set up only when it is beneficial and without wasting network resources. It is to such system and method that this invention is primarily directed.

SUMMARY OF THE INVENTION

The apparatus and method of the invention selectively request pre-call set up for a data communication between a wireless device and a base station depending on network conditions. In one embodiment, there is provided a method for a wireless device to initiate a pre-call set up for a push-to-talk (PTT) communication in a wireless communications network, wherein the wireless device communicates through wireless communications with a base station. The method includes receiving at the wireless device from a user an activation request for a directory application, checking for wireless communications network information stored on the wireless device, and if the wireless communications network information has a predetermined information indicating that pre-call set up will be advantageous and/or possible, initiating the pre-call set up for the PTT communication.

In another embodiment, there is provided an apparatus capable of communicating with a base station and selectively initiating, in response to an action by a user, an early push-to-talk (PTT) call set up for a PTT communication in a wireless communications network. The apparatus includes a transceiver unit for receiving from the base station wireless communications network information, a controller unit for analyzing the wireless communications network information, and a storage unit for storing the wireless communications network information and a data application. The controller, in response to activation of the data application by the user, checks the wireless communications network information and transmits an early PTT call set up to the base station if the wireless communications network information indicates that pre-call set up is advantageous.

The present apparatus and methods are therefore advantageous as they selectively enable a wireless device to send a pre-call set up request to a base station depending on network conditions, thus enable a fast PTT set up without wasting network resources. The wireless device can therefore take advantage of advanced network resources when present, yet still function quickly with limited network resources.

Other advantages and features of the present invention will become apparent after review of the hereinafter set forth Brief Description of the Drawings, Detailed Description of the Invention, and the Claims.

DETAIL DESCRIPTION OF THE INVENTION

Figure 1:
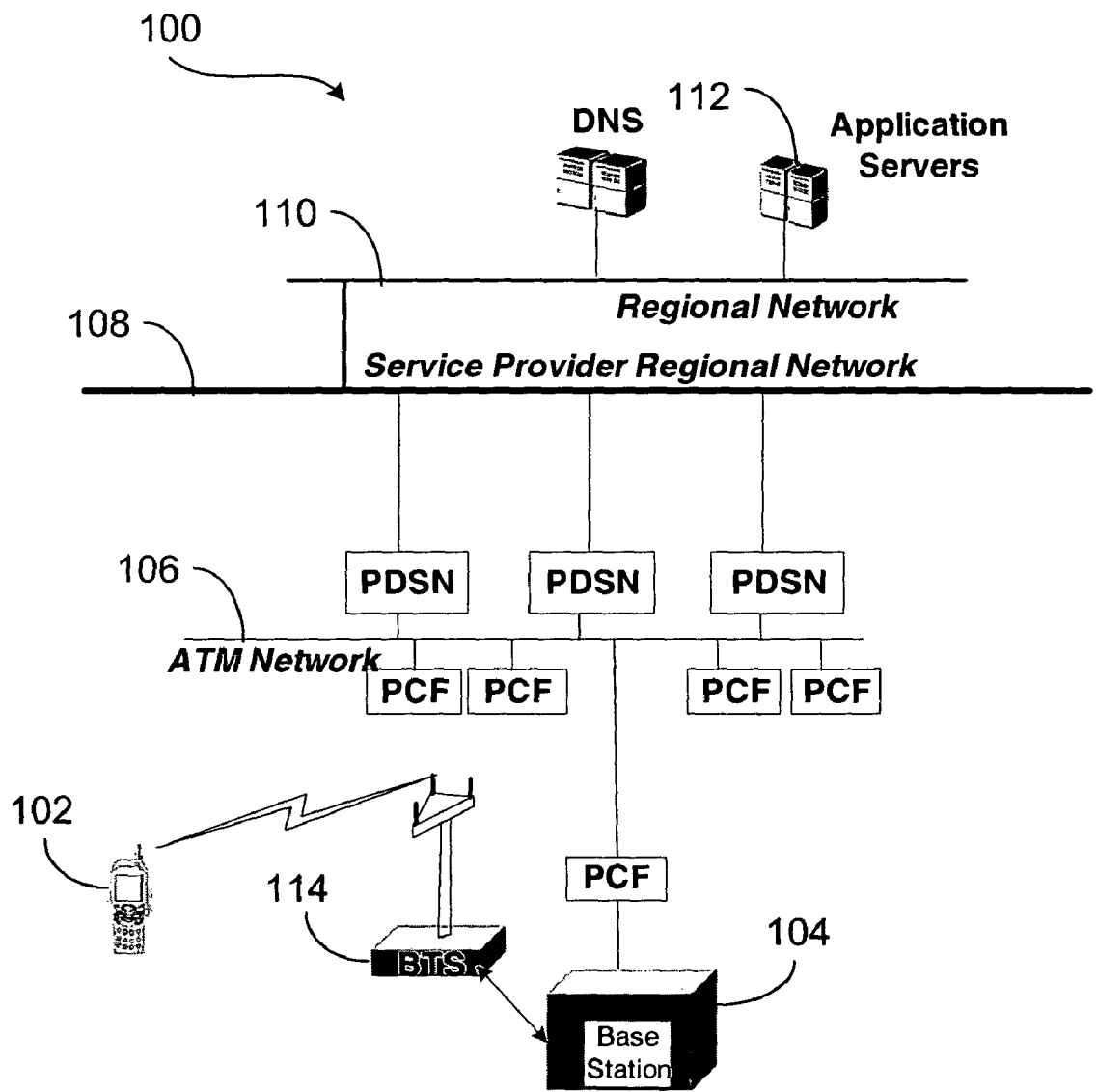
FIG. 1 is a prior art architecture of a wireless communication network.
Figure 2:
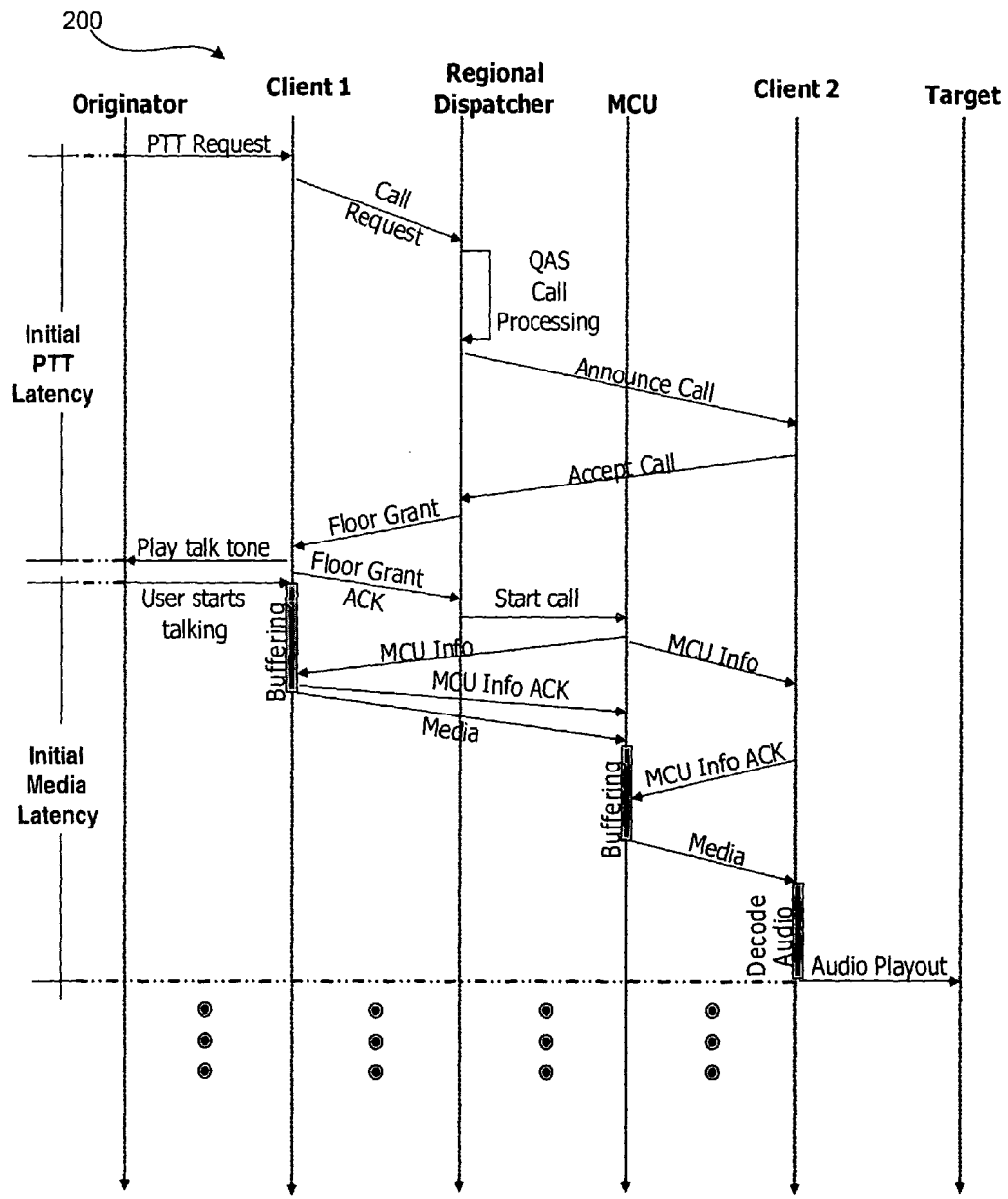
FIG. 2 is a prior art message flow for setting up a PTT call.

In this description, the terms "communication device," "Wireless device," "wireless communications device," "PTT communication device," "handheld device," "mobile device," and "handset" are used interchangeably. The terms "base station" and "base station server" are also used interchangeably. The term "application" as used herein is intended to encompass executable and nonexecutable software files, raw data, aggregated data, patches, and other code segments. The term "exemplary" means that the disclosed element or embodiment is only an example, and does not indicate any preference of use. Further, like numerals refer to like elements throughout the several views, and the articles "a" and "the" includes plural references, unless otherwise specified in the description.

In overview, the system and method selectively enable a wireless device to selectively send a PTT pre-call set up request to a base station depending on network conditions, thus enable a fast PTT set up without wasting network resources. One method to shorten the time to set up a PTT communication is to send a request for establishing a data channel between a wireless device 102 and a base station 104 when a user starts to browse an address book on the wireless device. By sending a request earlier, the base station 104 will proceed to establish a data channel between the wireless device 102 and the base station 104 while the user is still browsing the address book. The data channel will be up when the user selects a party from the address book for a PTT communication, and the PTT call request for the PTT communication can be transmitted via the data channel from the wireless device 102 to the base station 104.

However, the network resources assigned to the data channel between the wireless device 102 and the base station 104 will not be available to other wireless devices while the wireless device 102 is waiting for the user's action. If no action is taken by the user within a certain time period, a time out will occur and the network resources will then be released for others to use.

The invention presents a method for selectively enabling an early PTT call set up by first checking conditions of the wireless communications network. Upon powering up, a wireless device 102 communicates with the base station 104 and registers itself with a wireless communications network connected to that base station 104. The information about the wireless communications network is sent from the base station 104 to the wireless device 102. The same information about the network is also received from the base station 104 during the hand off procedure when the wireless device 102 moves from the coverage area of one base station 104 to the coverage area of another base station 104. The network information may contain the setting of the network (an urban area network versus a rural area network) and the traffic volume of the network at that time. This network information may be periodically broadcasted by the base station 104 to all the wireless devices in the coverage area. This network information is then used by the wireless device 102 to decide whether to start an early PTT call set up process.

When a user starts to browse a directory application, such as a telephone book application, on the wireless device 102, the wireless device 102 anticipates that the user may want to place a PTT communication. The wireless device 102 then retrieves the network information from its storage unit (memory) and checks for the network setting. If the user is using the wireless device 102 in an urban area, where most likely the network is on a high speed, high performance platform, the wireless device 102 may not initiate an early PTT call set up request for the time saved may not be beneficial compared with the resource tied up while waiting for the user. In the urban network, there may be many wireless devices competing for network resources even the network is on a fast response, high performance platform. If the user is in the urban area but using the wireless device 102 during a period with a low traffic volume where there are not many users using the network, the wireless device 102 may choose to enable the early PTT call set up request.

If the network information indicates that the user is in a rural area, where the network may not have the latest platform and fewer wireless devices compete for the network resources, or when the network platform is not a high speed, high performance platform and the data channel set up time may be longer, and the wireless device 102 can start the early PTT call set up procedure. The wireless device 102 can also start the early PTT call set up procedure if the network identification information (network ID) received from the network matches an entry in an internal table, as the wireless device 102 may be programmed to recognize certain networks as candidates for the early PTT call set up procedure. The early PTT call set up procedure involves in an early request for a data channel set up between the wireless device 102 and the base station 104. Once the data channel is up, the PTT call request can be transferred from the wireless device 102 to the base station 104 without delay.

Figure 3:
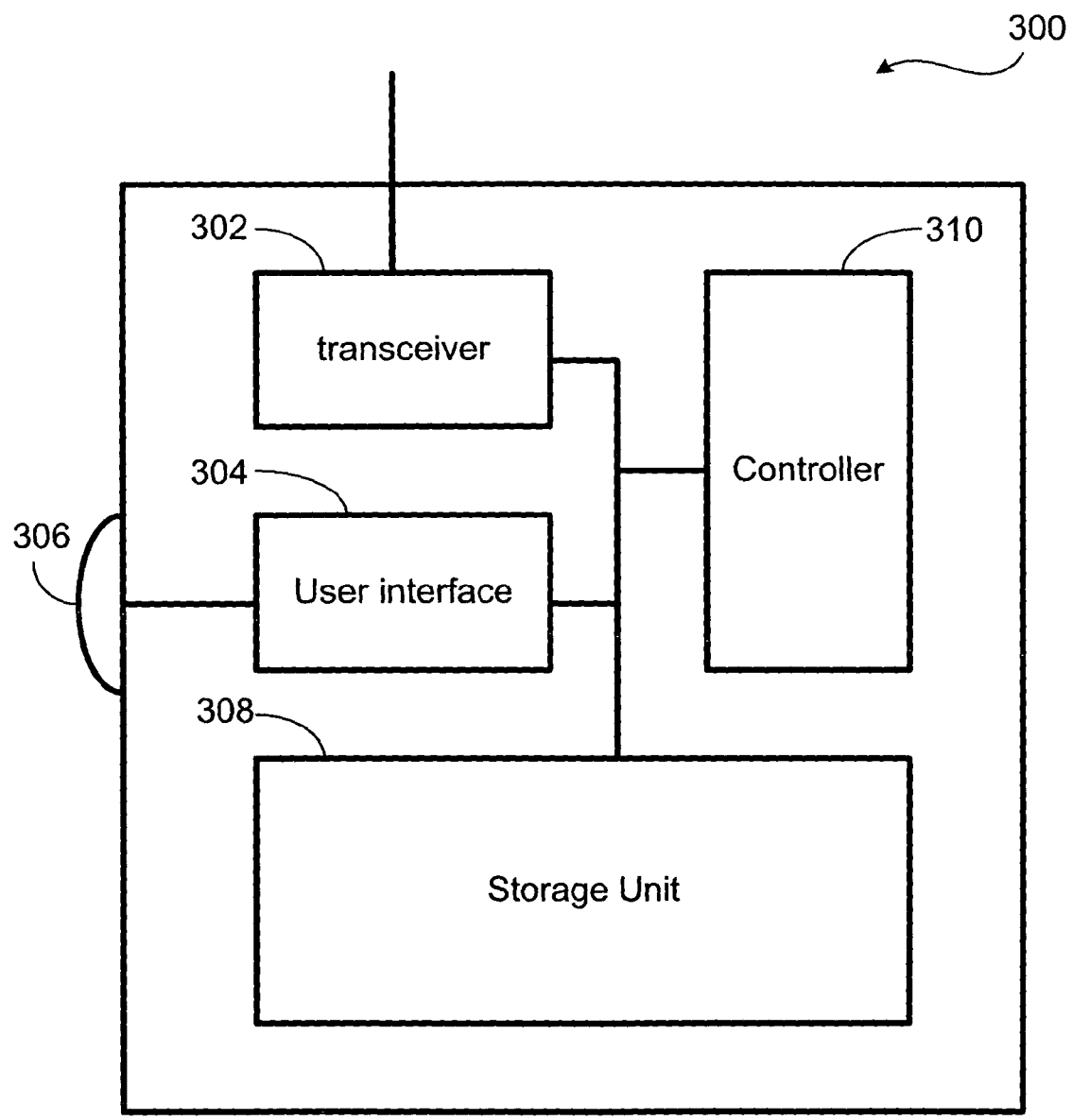
FIG. 3 is an architecture of a wireless device according to one embodiment of the invention.

FIG. 3 is a simplified architecture 300 of a wireless device 102 capable of flexibly enabling an early PTT call set up. The wireless device 102 includes a transceiver 302 for transmitting to and receiving data packets from the base station (base transmission station) 104, a user interface unit 304 for controlling user interface devices, which includes a PTT button 306, a storage unit 308 for storing information received from the base station 104 and application software, and a controller unit 310. The BS 104 communicates with the PTT server 112 through the data network.

Figure 4:
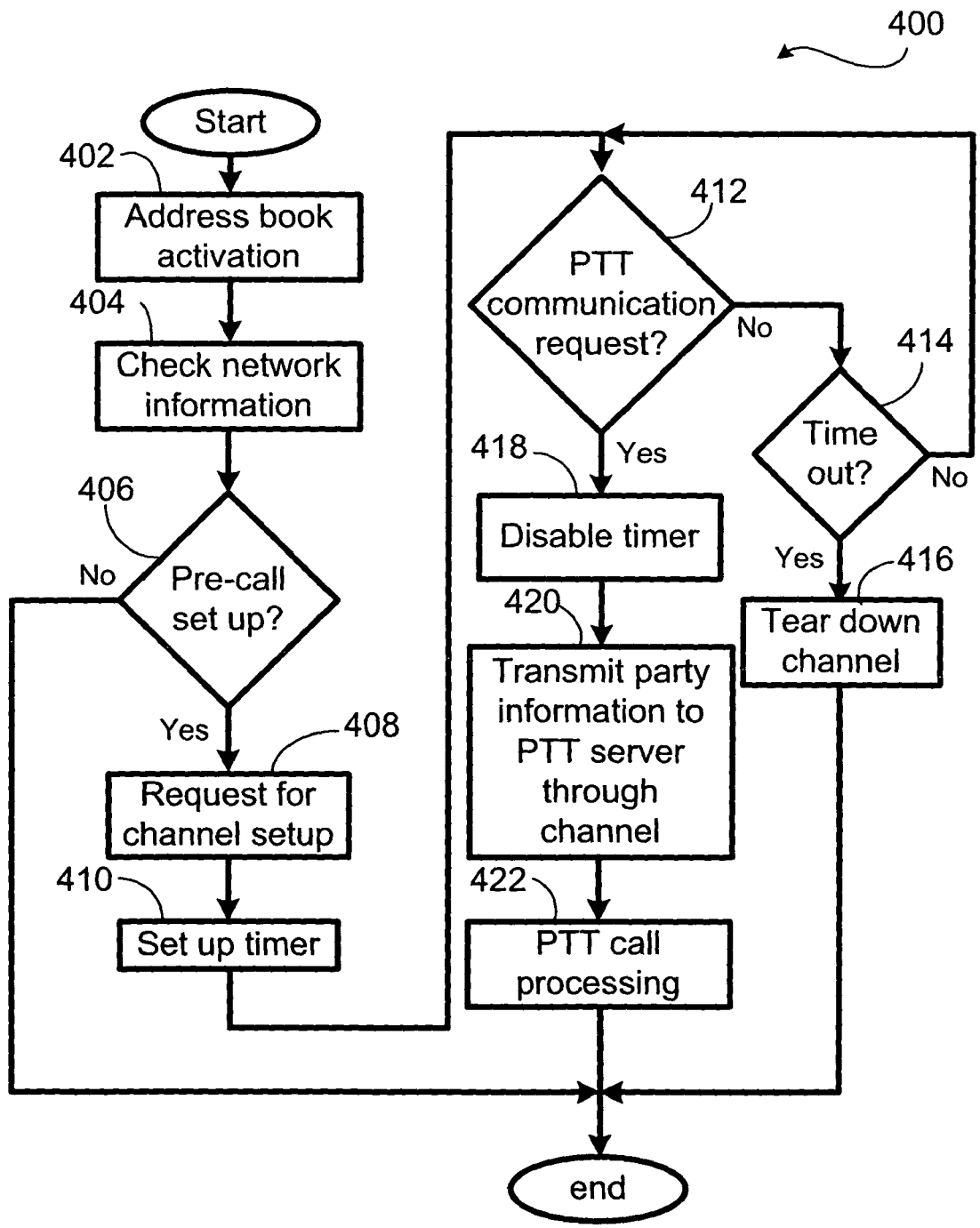
FIG. 4 is a flow chart for a wireless device process of detecting if a PTT pre-call set up is advantageous under current network conditions.

FIG. 4 is an exemplary flow chart 400 of an early data channel set up request process according to one embodiment of the invention. When a user activates an address book application, step 402, e.g., starts to browse a telephone directory, on the wireless device 102, the wireless device 102 checks for the network information stored in its memory, step 404. The network information is received during the registration procedure. The network information may also be received during the hand off procedure when the wireless device leaves one network and travels to an area covered by a new network. The wireless device 102 uses the network information to decide whether to request an early call set up, step 406. If the network information indicates that the network is in a less populated area with low usage, such as a rural network, the wireless device 102 will request a data channel set up, step 408. If the network information indicates the network is in an urban area with high usage, the wireless device 102 will not request the early call set up.

The wireless device 102 may also check other network information to decide whether to request the early call set up. The network information may include network traffic volume. If the network traffic volume is low, the wireless device 102 may request the early call set up even for an urban network. Alternatively, the wireless device 102 may also choose to use time of day as the criteria. For example, the wireless device 102 may only request the early call set up during a generally low traffic hours, such as after the business hours or late evening hours.

After requesting a data channel set up, the wireless device 102 sets up a timer, step 410, and continuously checks whether the user has activated the PTT communication, step 412 while the timer has not expired, step 414. If the timer expires before the user activating the PTT communication, the wireless device 102 tears down the data channel between the wireless device 102 and the base station 104, so the resources can be released and used by others.

If the user activates the PTT communication, i.e., selects a party with whom he wants to communicate through a PTT call and presses a PTT activation button, the wireless device 102 disables the timer, step 418, and sends a PTT call request with the party information through the data channel to the base station 104, step 420. The base station 104 will forward the PTT call request to a PTT server 112. After the PTT call request is sent, the wireless device 102 proceeds to process the PTT call, step 422.

Although the invention is described above in a PTT environment, the invention is not limited to PTT communications or limited to the PTT call set up. In a broader sense, the invention enables a wireless device 102 to selectively initiate a communication with the base station 104 depending on specific conditions of the wireless communications network.

In view of the method being executable on a wireless device, the method can be performed by a program resident in a computer readable medium. The computer readable medium can be the memory of the server, or can be in a connective database. Further, the computer readable medium can be in a secondary storage media, such as a magnetic disk or tape, optical disk, hard disk, flash memory, or other storage media as is known in the art, that is loadable onto a wireless device.

In the context of FIG. 4, the method may be implemented, for example, by operating a wireless device, to execute a sequence of machine-readable instructions. Though the steps are illustrated in sequence, the method may be implemented in difference sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other types of direct communication and media, such as video, data, etc. Furthermore, although elements of the invention may be described or claimed in the singular, the plural is contemplated unless limitation to the singular is explicitly stated.

What is claimed is:

1. An apparatus capable of communication with a base station and selectively initiating, in response to an action by the user, an early push-to-talk (PTT) call set up for a PTT communication in a wireless communications network, comprising:

a transceiver unit for receiving from the base station wireless communications network information from the base station, wherein the wireless communications network information identifies that the base station is a low speed base station having a longer call set up times than a high speed base station;

a controller unit for analyzing the wireless communications network information; and a storage unit for storing the wireless communications network information and a data application, wherein, the controller, in response to the activation of the data application, checks the wireless communications network information stored on the storage unit, determines that the base station is a low speed base station, and transmits an early PTT call set up to the base station.

2. The apparatus of claim 1, the controller further being capable of:

receiving from the base station a wireless communications network information during a registration procedure; and storing the wireless communications network information on the storage unit.

3. The apparatus of claim 1, the controller further being capable of:

receiving from the base station a wireless communications network information during a hand off procedure; and storing the wireless communications network information on the storage unit.

4. The apparatus of claim 1, further comprising a timer.

5. The apparatus of claim 4, the controller further being capable of:

transmitting to the base station a data channel request for setting up a data channel between the apparatus and the base station;

setting up the timer;
if the timer expires before a PTT call activation request is received from the user, requesting the data channel be removed; and
if the PTT call activation request is received before the timer expires, disabling the timer and sending the PTT call activation request to the base station through the data channel.

6. The apparatus of claim 1, wherein the data application is an address book application.

7. The apparatus of claim 1, wherein the wireless communications network information includes a network type.

8. The apparatus of claim 1, wherein the wireless communications network information includes network traffic volume information.

9. The apparatus of claim 1, wherein the wireless communications network information includes time information.

10. A method for wireless device to initiate a pre-call set up for a push-to-talk (PTT) communication in a wireless communications network, wherein the wireless device communicates through wireless communications with a base station, comprising the steps of:
receiving, by a transceiver, wireless communications network information, wherein the wireless communications network information is received from the base station, and wherein the wireless communications network information identifies that the base station is a low speed base station having a longer call set up times than a high speed base station;
analyzing by a controller unit, the wireless communications network information; and
storing in a storage unit, the wireless communications network information and a data application,
wherein, the controller, in response to the activation of the data application, checks the wireless communications network information stored on the storage unit, determines that the base station is a low speed base station, and transmits an early PTT call set up to the base station.

11. The method of claim 10, further comprising:
receiving from the base station by the controller unit, a wireless communications network information during a registration procedure; and
storing the wireless communications network information on the storage unit.

12. The method of claim 10, further comprising:
receiving, from the base station by the controller unit, a wireless communications network information during a hand off procedure; and
storing the wireless communications network information on the storage unit.

13. The method of claim 10 further comprising:
transmitting, by the controller to the base station, a data channel request for setting up a data channel between the apparatus and the base station; and
setting up a timer, wherein if the timer expires before a PTT call activation request is received from the user, requesting the data channel be removed, and wherein if the PTT call activation request is received before the timer expires, disabling the timer and sending the PTT call activation request to the base station through the data channel.

14. The method of claim 10, wherein the data application is an address book application.

15. The method of claim 10, wherein the wireless communications network information includes a network type.

16. The method of claim 10, wherein the wireless communications network information includes network traffic volume information.

17. The method of claim 10, wherein the wireless communications network information includes time information.

18. An apparatus capable of communicating with a base station and selectively initiating, in response to an action by a user, an early push-to-talk (PTT) call set up for a PTT communication in a wireless communications network, comprising:
transceiver means for receiving wireless communications network information, wherein the wireless communications network information is received from the base station, and wherein the wireless communications network information identifies that the base station is a low speed base station having a longer call set up times than a high speed base station;
controller means for analyzing the wireless communications network information; and
storage means for storing the wireless communications network information and a data application,
wherein, the controller, in response to the activation of the data application, checks the wireless communications network information stored on the storage unit, determines that the base station is a low speed base station, and transmits an early PTT call set up to the base station.

19. The apparatus of claim 18, further comprising:
controller means for receiving from the base station, a wireless communications network information during a registration procedure; and
storage means for storing the wireless communications network information.

20. The apparatus of claim 18, further comprising:
controller means for receiving, from the base a wireless communications network information during a hand off procedure; and
storage means for storing the wireless communications network information.

21. The apparatus of claim 18 further comprising:
controller means for transmitting to the base station, a data channel request for setting up a data channel between the apparatus and the base station; and
means for timing with a timer, wherein if the timer expires before a PTT call activation request is received from the user, requesting the data channel be removed, and wherein if the PTT call activation request is received before the timer expires, disabling the timer and sending the PTT call activation request to the base station through the data channel.

22. The apparatus of claim 18, wherein the data application is an address book application.

23. The apparatus of claim 18, wherein the wireless communications network information includes a network type.

24. The apparatus of claim 18, wherein the wireless communications network information includes network traffic volume information.

25. The apparatus of claim 18, wherein the wireless communications network information includes time information.

26. A computer readable storage medium having stored thereon instructions for a wireless device to initiate a pre-call set up for a push-to-talk (PTT) communication in a wireless communications network, wherein the wireless device communicates through wireless communications with a base station, the instructions comprising:
instructions for receiving, by a transceiver, wireless communications network information, wherein the wireless communications network information is received from the base station, and wherein the wireless communications network information identifies that the base station is a low speed base station having a longer call set up times than a high speed base station;

instructions for analyzing, by a controller unit, the wireless communications network information; and instructions for storing, in a storage unit, the wireless communications network information and a data application, wherein the controller, in response to the activation of the data application, checks the wireless communications network information stored on the storage unit, determines that the base station is a low speed base station, and transmits an early PTT call set up to the base station.

27. The computer readable storage medium of claim 26, further comprising:

instructions for receiving from the base station by the controller, a wireless communications network information during a registration procedure; and instructions for storing the wireless communications network information on the storage unit.

28. The computer readable storage medium of claim 26, further comprising:

instructions for receiving from the base station by the controller, a wireless communications network information during a hand off procedure; and storing the wireless communications network information on the storage unit.

29. The computer readable storage medium of claim 26 further comprising:

transmitting, by the controller to the base station a data channel request for setting up a data channel between the apparatus and the base station; and setting up a timer, wherein if the timer expires before a PTT call activation request is received from the user, requesting the data channel be removed, and wherein if the PTT call activation request is received before the timer expires, disabling the timer and sending the PTT call activation request to the base station through the data channel.

30. The computer readable storage medium of claim 26, wherein the data application is an address book application.

31. The computer readable storage medium of claim 26, wherein the wireless communications network information includes a network type.

32. The computer readable storage medium of claim 26, wherein the wireless communications network information includes network traffic volume information.

33. The computer readable storage medium of claim 26, wherein the wireless communications network information includes time information.

* * * * *